United States Patent [19]

Elks

[11] 4,390,862
[45] Jun. 28, 1983

[54] PROXIMITY INDICATOR FOR MOTOR VEHICLES

[76] Inventor: William J. Elks, 1310 Cary Way, San Diego, Calif. 92109

[21] Appl. No.: 254,825

[22] Filed: Apr. 16, 1981

[51] Int. Cl.³ .......................... B60Q 9/00; H01H 3/16
[52] U.S. Cl. .................................... 340/61; 200/61.44
[58] Field of Search ............ 340/61; 200/61.41, 61.44, 200/61.23, 61.24; 307/10 R

[56] References Cited

U.S. PATENT DOCUMENTS

| | | | |
|---|---|---|---|
| 1,809,434 | 6/1931 | Winning | 307/10 R |
| 2,520,305 | 8/1950 | Campbell | 340/61 |
| 2,542,708 | 2/1951 | Rogow | 200/61.41 X |
| 2,554,371 | 5/1951 | Marx | 340/61 X |
| 2,812,397 | 11/1957 | Taylor | 200/61.44 |
| 2,896,037 | 7/1959 | Vossen | 200/61.44 X |
| 2,930,862 | 3/1960 | Samaniego | 200/61.44 |
| 3,608,513 | 9/1971 | Gray | 340/61 X |
| 4,042,909 | 8/1977 | Perez | 340/61 X |

*Primary Examiner*—John W. Caldwell, Sr.
*Assistant Examiner*—Joseph E. Nowicki
*Attorney, Agent, or Firm*—Ralph S. Branscomb

[57] ABSTRACT

A proximity indicator for motor vehicles, particularly recreational vehicles, has an audio or visual signal mounted in the driver's compartment and utilizes a probe which passes through a ring contact as the switching element, the probe and ring contact being longitudinally adjustable mounted in a yoke which is connected to the clamping structure with a single bolt which, when loosened, permits a longitudinal adjustment of the probe, the ring contact, and rotational adjustment of the probe and ring together.

6 Claims, 6 Drawing Figures

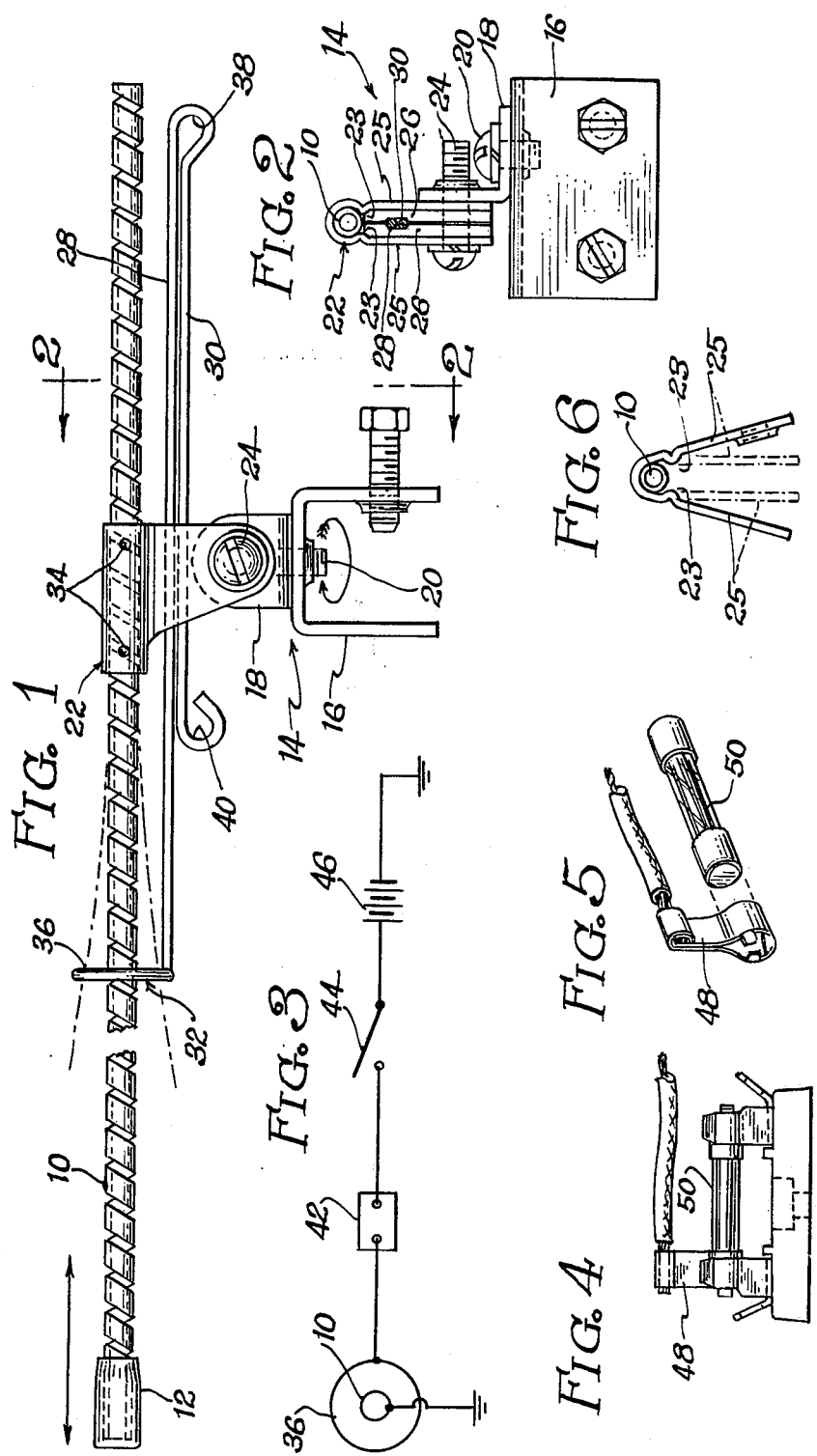

PROXIMITY INDICATOR FOR MOTOR VEHICLES

BACKGROUND OF THE INVENTION

The invention is in the field of "curb feelers." A lot of different devices have been conceived for this purpose, the simplest and the one which has principally been implemented being no more than a length of wire or coiled sheet metal which scrapes against the curb, alerting the driver by its scraping sound that the curb has been touched. This type of proximity indicator is useless to the driver of a recreational vehicle, and many cars as well, because the driver cannot hear the noise made by the scraper. Although units have been conceived which utilize an electrical alarm of some type, often these designs are problematic either in that they are too complicated to be practical, or because of the nature of the electrical contact. Another problem experienced with recreational vehicles is the need for a longer probe than conventional curb scrapers have. The length also must be variable, inasmuch as different vehicles, and even different mountings on the same vehicle, would require a different length. There is a real need for some type of inexpensive, reliable sensor having a signal that can be heard or seen from inside the driving compartment. This can be attested to by any car dealer, who has seen many misaligned front wheels resulting from the new driver being unable to judge wheel location. The same is true of many recreational vehicle drivers.

SUMMARY OF THE INVENTION

The present invention fulfills the above indicated needs by providing a proximity indicator with an audio or visual alarm in the driver's compartment. The curb feeler probe is axially adjustable by virtue of its being able to slip inside its retaining yoke when the mounting bolt is loosened, and contact is made by a ring contact on a shaft which moves parallel to the probe to permit adjustment of the sensitivity. The same yoke that retains both the probe and the ring contact shaft is mounted by a single bolt to an ell-shaped bracket which is in turn bolted to a clamp, this configuration enabling rotational adjustment in two perpendicular planes which when coupled with the ability to axially adjust the ring contact and the probe enables the unit to fit any vehicle. Power for the unit may be derived from a fuse end cap which can be inserted over any fuse, enabling the user to have the proximity indicator activated only when the ignition is on, or all the time, and in either instance it could be connected either between the fuse and the battery so that it must be separately fused but does not add to the current load of the existing fuse, or it may be connected between the fuse and ground thus taking advantage of the protection provided by the existing fuse.

BRIEF DESCRIPTION OF THE DRAWINGS

FIG. 1 is a side elevation view of the indicator;
FIG. 2 is a section taken along line 2—2 of FIG. 1;
FIG. 3 is a schematic diagram of the circuit;
FIG. 4 indicates the fuse end cap in place;
FIG. 5 is a perspective view indicating the relationship between the cap and the fuse;
FIG. 6 is a diagrammatic view of the end of the yoke when open, with the closed position shown in phantom.

DETAILED DESCRIPTION OF THE PREFERRED EMBODIMENT

As shown in FIG. 1, the indicator has a feeler or probe 10 which could be any desired length but most practically would run between 15 and 20 inches. The feeler indicated in the drawing is made of a tight spiral of sheet metal with an end cap 12. However, a monofilament such as piano wire could also be used, or a combination of piano wire and the spiral. It has been found that a spiral portion of the probe which extends through the sensor loop (described below) with a piano wire extension to the terminal point is quite effective, and greatly reduces the windage and pendulum efforts inherent in a continuous spiral probe.

The probe is mounted in what is generally termed a mounting bracket indicated at 14. The mounting bracket is comprised of a clamp 16, an ell-shaped bracket 18 which is bolted to the clamp at 20, a yoke 22 bolted at 24, and a pair of insulators 26 captured between the sides of the yoke 22. As shown in FIG. 6, the yoke has a saddle portion 23 which, when open, accepts the probe 10 and when the side portions 25 of the yoke are pinched tight with the bolt 24, the probe is tightly gripped in the saddle 23 with a leveraging action to prevent any moment of the probe relative to the yoke when the bolt 24 is tight.

The insulators are channeled and in the channels are captured the main shafts 28 and the return shaft 30 of the ring contact generally indicated at 32. The probe 10 is also captured inside the yoke, and it can be seen from FIG. 2 that both the ring contact 32 and the probe are axially adjustable by loosening bolt 24. Adjustment of the coil-type probe that is shown can also be expedited by the incorporation of a pair of dimples 34 properly spaced to permit the feeler to be rotated or screwed to advance or retard. The bolt 24 also permits the angular adjustment in a plane perpendicular to itself when it is loosened, and the bolt 20 permits rotation in a perpendicular plane so that any angle can be established by suitable adjustment of the two bolts.

Ordinarily, the clamp 16 would, of course, be clamped on any handy portion of the vehicle body or frame. Alternatively, however, the clamp could be omitted entirely and the bolt 24 engaged directly into a hole bored in the vehicle.

The contact 32 has a ring 36 which serves as the actual physical contact, and by varying axially the relative location of the ring to the yoke 22, the sensitivity of the indicator can be varied at will. This is important because when the vehicle is in motion the combination of the force of the wind and road conditions will cause a certain amount of vibration of the probe.

The ring contact 32 is provided with a pair of loop contacts 38 and 40, either of which may be used to connect the wire which completes the circuit through the ring contact and the probe. The double shafts 28 and 30 are for the purpose of preventing the rotation of the ring 36 eccentrically off the probe. The same effect could be achieved by knurling or making non-circular in cross section the shaft 28, and omitting the return shaft 30 altogether.

The circuit as shown in FIG. 3 includes an alarm or signal device 42 which can be audio, visual, or both, and an on-off switch 44. Power takeoff from the battery 46 may be done in any fashion, or the specially designed fuse cap 48 can be engaged over the end of a fuse 50. This arrangement has the above stated advantage of flexibility in enabling the user to tie the system to the ignition or not, and gives him the option of using an existing fuse. Adjustably, persons having little or no knowledge of automotive electrical systems can select and makes electrical connections to the chosen circuit without special tools or instruments to identify the circuit, since manufacturer-installed fuse blocks identify fuses in writing or on the fuse block.

Because of the extreme simplicity of construction, the disclosed indicator is quite inexpensive to make, and is easy to adjust on installation because of the ability to adjust both angle and length with a single bolt 24 which also mounts the ring contact and probe. The ring contact has the inherent ability to be self-cleaning by virtue of the wiping action that it will receive from the probe every time the probe contacts an object and moves off center. The elemental simplicity of the system is further enhanced by the incorporation of the fuse cap, enabling anyone, regardless of their technical sophistication, to install the device. Ground, of course, is achieved through the mounting bracket 14.

While I have described the preferred embodiment of the invention, other embodiments may be devised and different uses may be achieved without departing from the spirit and scope of the appended claims.

What is claimed is:

1. A proximity indicator for a vehicle comprising:
   (a) a mounting bracket defining a yoke;
   (b) a feeler probe extending from said yoke and at least a portion of which is conductive;
   (c) a ring contact having a shaft mounted in said yoke, said ring contact encircling said probe;
   (d) both said ring contact shaft and said probe being longitudinally adjustable for sensitivity and proximity settings, respectively by virtue of a common adjustable yoke engaging same therebetween;
   (e) an electric signal;
   (f) a powered electric circuit defined through said signal, probe and ring such that it is closed when said probe contacts said ring, whereby deflection of said probe against said contact actuates said signal.

2. Structure according to claim 1 wherein said yoke has a saddle portion and extended side portions and said saddle portion is dimensioned relative to said probe such that the latter is compressed prior to the closing of said side portions in a parallel, retaining relationship whereby said probe is tightly gripped by said saddle when said side portions are compressed.

3. Structure according to claim 1 wherein said yoke is part of said mounting bracket and is retained by a single bolt to the remainder of said bracket such that said bolt may be loosened to axially adjust either or both said probe and said ring contact or rotationally adjust said yoke.

4. Structure according to claim 3 wherein said bolt mounts said yoke to one leg of an ell bracket which in turn is mounted with a bolt through the other leg to a clamp, whereby said yoke is rotationally adjustable in two substantially perpendicular planes.

5. A proximity indicator for a vehicle comprising:
   (a) a mounting bracket;
   (b) a feeler probe extending from said bracket and at least a portion of which is conductive;
   (c) a ring contact having a shaft mounted in said mounting bracket, said ring contact encircling said probe and being slideable parallel thereto for sensitivity adjustment;
   (d) an electric signal;
   (e) a powered electric circuit defined through said signal, probe and ring such that it is closed when said probe contacts said ring, whereby deflection of said probe against said contact actuates said signal; and
   (f) said ring shaft being doubled back on itself in said mounting bracket to insure against twisting.

6. Structure according to claim 5 wherein said doubled back shaft defines a terminal loop at both ends.

* * * * *